UNITED STATES PATENT OFFICE 2,644,818

MANUFACTURE OF CELLULOSE ETHERS

John Downing and James Gordon Napier Drewitt, Spondon, near Derby, England, assignors to British Celanese Limited, a company incorporated of Great Britain No Drawing. Application January 14, 1950, Serial No. 138,703. In Great Britain February 25, 1949

4 Claims. (Cl. 260—231)

This invention relates to the manufacture of cellulose ethers, especially alkyl celluloses.

Alkyl celluloses are usually made by first forming alkali cellulose and then treating this with an alkyl halide, commonly an alkyl chloride. A usual method of making the alkali cellulose is to impregnate cellulose in the form of sheets of wood pulp (i. e. in the form in which wood pulp is normally supplied by the producers) with a caustic soda solution of the required concentration, and then to press the sheets so as to expel unwanted alkali solution; thus in making water-soluble alkyl celluloses it is usual to press the sheets until a product weighing between about 2.5 and 3.5 times as much as the original air-dry sheet remains. This impregnated sheet is then shredded, introduced into a suitable reaction vessel and etherified.

The present invention is particularly concerned with processes in which the etherification is carried out in the liquid phase, i. e. in which the alkyl halide is present in the liquid phase during the etherification. For example methyl cellulose may be made by reacting alkali cellulose with methyl chloride at a temperature of about 60°–100° C. under the pressure necessary to keep the methyl chloride liquid. When working in this way it has in the past been found necessary, if a uniform product is to be obtained, that the mixture of the alkyl halide and the alkali cellulose should be well stirred during the etherification reaction. The necessity for stirring is, of course, a complication in any process, and especially when the reaction has to be carried out under pressure.

We have now found that it is possible to obtain a product of satisfactory uniformity without stirring by making use of alkali cellulose in a particular form. This form is obtained by breaking up a sheet or like mass of alkali cellulose, and is characterised by having a high packing density when compared with the shredded alkali cellulose heretofore commonly employed. More particularly, it has a packing density above 15 lb./cu. ft., and especially between about 18 and 25 or 30 lb./cu. ft. The alkali cellulose preferably contains less than 5 moles of alkali for each mole of cellulose (anhydroglucose unit).

Any suitable method of obtaining the alkali cellulose in a form of high packing density may be employed. In one method, sheet alkali cellulose, prepared as already described, may be cut up into fairly small pieces, for example into pieces of superficial area between about 1 and 6 sq. ins., e. g. into squares of about 2-in. side. It may however be more convenient to employ a suitable type of machine, for example a Bridge-Banbury mixer, to disintegrate the alkali cellulose sheet, the machine being set to produce a product of the required packing density.

The application of the invention to the production of water-soluble methyl cellulose and the effect of high packing density in promoting uniform reaction are well illustrated by a comparison of the clarities of various samples of methyl cellulose prepared from different forms of an alkali cellulose. The general method employed was in all cases the same. Wood pulp in sheet form was immersed in caustic soda solution of concentration about 30%, and then pressed until the molecular ratio of caustic soda to cellulose (as determined by analysis) was between 2.1 and 2.6. The sheets were then broken up by a Bridge-Banbury mixer or a hammer mill or cut into 2-in. squares; the packing densities of the first and last of these forms were roughly the same, at about 20–22 lb./cu. ft., while that of the alkali cellulose broken up in the hammer mill was much lower, at 5–7 lb./cu. ft. The materials were then placed in an autoclave which was evacuated; 20 molecular proportions of methyl chloride for each molecular proportion of cellulose was forced in, and the autoclave was heated to 70° C. for 2 hours; the pressure developed was 240–260 p. s. i. g. During some runs the contents of the autoclave were stirred, and the others were performed without agitation. The autoclave was cooled, unchanged methyl chloride blown off, and the solid product washed repeatedly with boiling water and then dried in an oven at 110° C.

Samples of the dried methyl cellulose so obtained were dissolved in water to give 2% solutions, and the clarities of these solutions were determined. It was found that, using the alkali cellulose which had been broken up in the Bridge-Banbury mixer and which had a packing density of 20–22 lb./cu. ft., the clarities of products made without stirring were as high as, and sometimes higher than, those of products made with stirring. With the hammer mill alkali cellulose, on the other hand, the clarities of products made without stirring were only about one-third of those made with stirring. The third method (using alkali cellulose cut into squares) gave, without stirring, a product having a clarity about as high as that of the best product made by either of the other methods with stirring.

The method described above for making methyl cellulose can be applied, with the necessary modifications in conditions and changes in the etherifying agent as well known in the art, for making other alkyl celluloses, especially water-soluble alkyl celluloses. The alkyl celluloses may contain one type of alkyl group only or two or more types; they may also contain other etherifying groups in addition to alkoxyl, especially such other groups as promote water-solubility, and can be introduced by means of etherifying agents in a fluid, preferably the liquid, phase simultaneously with alkoxyl groups or at least in the same reaction vessel and immediately before or after the introduction of the alkoxyl groups; one example of such other groups is hydroxy-ethoxyl, which can be introduced into the cellulose molecule by means of ethylene oxide. Examples of cellulose ethers other than methyl cellulose which can be made by the process of the invention are water-soluble ethyl cellulose, methyl ethyl cellulose, methyl isopropyl cellulose, methyl hydroxyethyl cellulose, and ethyl hydroxyethyl cellulose.

The term "Packing density" is used in the present specification to denote the apparent density of a mass of fragments of alkali cellulose which has been shaken down but has not been compacted by the application of external pressure.

The invention is further illustrated by the following example.

*Example.*—A wood pulp of high alpha-cellulose content in sheet form was immersed in a 30% aqueous caustic soda solution for about 1 hour, and was then pressed to a wet/dry ratio of 2.45. The sheet was broken up in a Bridge-Banbury mill, giving a product of packing density about 22 lb./cu. ft., and the product introduced into an autoclave from which the air was at once evacuated. 6 parts by weight of methyl chloride for each part of cellulose (reckoned as one anhydro-glucose unit) was then forced in, and the autoclave was heated to 70° C. The contents of the autoclave were not stirred or otherwise agitated. After 2 hours the autoclave was allowed to cool, unchanged methyl chloride was blown off, and the solid product was washed with hot water until free from sodium chloride and then dried at 110° C. It has a methoxyl content of 24.0% and good clarity (58%), with a coagulation temperature of 66–70° C.

Having described our invention, what we desire to secure by Letters Patent is:

1. Process for the manufacture of water-soluble cellulose ethers, which comprises impregnating sheet cellulose with caustic soda solution, pressing out excess solution until the sheet contains less than 5 moles of caustic soda for each mole of cellulose, breaking up the sheet of alkali cellulose so obtained into a particulate form having a superficial area of 1 to 6 square inches and having a packing density above 15 pounds/cubic foot, mixing the alkali cellulose with an alkyl chloride, containing 1 to 3 carbon atoms in the molecule, in the liquid phase, and allowing the alkali cellulose and the alkyl chloride to react until the water-soluble alkyl cellulose has been formed, the alkyl chloride being kept in the liquid phase and substantially still during the reaction.

2. Process according to claim 1, wherein the packing density of the alkali cellulose is between 18 and 30 pounds/cubic foot.

3. Process according to claim 1, wherein the alkali cellulose contains 2.1 to 2.6 moles of caustic soda for each mole of cellulose.

4. Process for the manufacture of water-soluble methyl cellulose, which comprises impregnating sheet cellulose with caustic soda solution, pressing out excess solution until the sheet contains 2.1–2.6 moles of caustic soda for each mole of cellulose, breaking up the sheet of cellulose so obtained into a particulate form having a superficial area of 1 to 6 square inches and having a packing density between 18 and 30 pounds/cubic foot, mixing the alkali cellulose with methyl chloride in the liquid phase, and allowing the alkali cellulose and the methyl chloride to react until the water-soluble methyl cellulose has been formed, the methyl chloride being kept in the liquid phase and substantially still during the reaction.

JOHN DOWNING.
JAMES GORDON NAPIER DREWITT.

References Cited in the file of this patent

UNITED STATES PATENTS

| Number | Name | Date |
|---|---|---|
| 1,469,824 | Seel | Oct. 9, 1923 |
| 2,067,946 | Picton | Jan. 19, 1937 |
| 2,145,862 | Collings et al. | Feb. 7, 1939 |
| 2,149,310 | Peterson et al. | Mar. 7, 1939 |
| 2,408,326 | Maasberg | Sept. 24, 1946 |
| 2,447,914 | Ruperti | Aug. 24, 1948 |